United States Patent [19]

Shemer

[11] 4,188,399
[45] Feb. 12, 1980

[54] PROCESS FOR PREPARING A HEAT COAGULABLE VISCOUS PROTEIN

[75] Inventor: Michael Shemer, Worthington, Ohio

[73] Assignee: Miles Laboratories, Inc., Elkhart, Del.

[21] Appl. No.: 535,944

[22] Filed: Dec. 23, 1974

[51] Int. Cl.² ............................. A23J 3/00; A23J 1/14
[52] U.S. Cl. .................................. 426/276; 260/123.5; 426/431; 426/541; 426/641; 426/656; 426/802
[58] Field of Search ............... 426/212, 276, 378, 431, 426/515, 541, 641, 656, 802; 260/123.5

[56] References Cited

U.S. PATENT DOCUMENTS

| | | | |
|---|---|---|---|
| 2,670,291 | 2/1954 | Melnick | 426/431 X |
| 2,785,155 | 3/1957 | Anson et al. | 426/431 X |
| 3,579,496 | 5/1971 | Martinez et al. | 426/431 X |
| 3,870,801 | 3/1975 | Tombs | 426/276 X |
| 3,953,611 | 4/1976 | Youngguist | 426/656 X |

Primary Examiner—Joseph M. Golian
Attorney, Agent, or Firm—Richard W. Winchell

[57] ABSTRACT

Heat coagulable viscous protein product is prepared from oleaginous seed materials by forming an aqueous slurry thereof having a pH of about 5.1 to about 5.9, separating the liquid from the solids portion of said slurry, and recovering the protein product from said separated liquid.

16 Claims, No Drawings

PROCESS FOR PREPARING A HEAT COAGULABLE VISCOUS PROTEIN

BACKGROUND AND PRIOR ART

An increasing need to supply a growing world population with protein foods has led scientists to pursue many nonmeat protein sources. The protein contained in vegetable products, especially in oleaginous seed materials, is a valuable source of such protein for human consumption. The natural protein, however, is highly sensitive to the rigors of extraction and fractionation procedures and therefore the production of a highly nutritious and functional protein from oleaginous materials which can be converted into palatable meat-like food products has been a major obstacle to the general use of these materials. A great deal of research has been conducted to improve these extraction and fractionation procedures and various methods have been used.

Oleaginous seed materials are known to contain a large number of proteins, carbohydrates, salts and other cellular matter. It is from this complex mixture that proteins must be extracted and fractionated to produce useful food products. The extractability of oleaginous proteins from this mixture is greatly influenced by a variety of factors including temperature, pH, salt concentration and the like. For instance, the majority of the total proteins available in soybeans are largely insoluble in aqueous solution in the pH range from about 3.5 to about 6.0. The conventional extraction and fractionation procedure, utilizing this solubility phenomenon, produces protein isolates from defatted soybeans by solubilizing the protein in highly alkaline aqueous medium above pH 6.0, recovering the proteins by precipitation at their average isoelectric point, pH 4 to 5, and drying the precipitated proteins. These protein isolates are then useful as emulsifiers, binders and as the chief structural materials of meat analogs prepared by fiber spinning and heat gelation techniques. Although widely used for these purposes, the rigorous alkaline treatment frequently required to solubilize the proteins in the seed material or subsequently required to resolubilize and gel the proteins for fiber spinning or extrusion purposes results in some partial irreversible protein degradation and loss of physioelastic properties. In addition the proteins which are recovered by precipitation in acid salt solutions are invariably contaminated by large amounts of absorbed salts which are only partially removed by extensive washing.

It is therefore desirable to produce a highly functional and heat coagulable protein product which has not been conventionally treated under highly alkaline conditions and has not been contaminated with absorbed salts. A novel approach which solves some of the conventional problems is disclosed by Tombs in Great Britain Patent No. 1,265,661. Tombs avoids the need for highly alkaline pH conditions by preparing the plant proteins in the form of a mesophase, i.e., protein maintained in the dissolved state at a pH from 3 to 9 by a dissolved water-soluble salt. In this procedure, defatted oleaginous seed proteins are solubilized in an aqueous medium and precipitated at a pH of 4 to 6 to yield a protein isolate. A water soluble salt is then added to an aqueous suspension of the freshly separated protein isolate at a concentration based on a minimum ionic strength of 0.2 calculated on the water content of the composition. After centrifugation of this mixture, a dense phase of fluid aqueous protein or mesophase separates. This mesophase has the unique properties of fluidity and high dissolved protein concentration at a pH below that at which protein degradation occurs. Without further treatment the mesophase may be used in the preparation of spun fibers or used as a heatsetting binder for other edible materials. Unfortunately this procedure also recovers a protein which is contaminated with relatively high concentration of salts without which a mesophase having these unique properties could not be formed.

SUMMARY OF THE INVENTION

It has now been discovered that a protein product can be produced from oleaginous seed materials which has excellent functional and heat coagulating properties and without the disadvantage of the prior art products described above.

In accordance with the present invention, a novel process is provided for the preparation of a heat coagulable viscous protein product which comprises forming an aqueous slurry of an oleaginous seed material having a pH of about 5.1 to about 5.9, separating the liquid from the solids portion of said slurry, and recovering the protein fraction from said separated liquid.

DESCRIPTION OF THE INVENTION

The starting material useful in the process of the present invention is an oleaginous seed material. Such oleaginous seeds include legumes, rapeseed, safflower, sunflower and the like. It is preferred to use the legumes which include beans, lentils, peanut, soybean and the like. The most preferred leguminous seed is soybean.

Most oleaginous seed materials are commercially available as full fat, low fat, or defatted meals, flakes and flours having a protein content of about 30 to 55 percent on a dry weight basis. For example, full fat soy flakes are prepared by dehulling and flaking the full fat soybean seeds. Low fat soy meals are prepared from the pressed cake obtained from a low temperature expression of oil from soybean seeds. Defatted soy flakes are prepared by the organic solvent extraction of oil from the full fat soy flakes. Alternatively, defatted soy flours are prepared by grinding the defatted soy flake to a flour. It is most preferred to use the defatted oleaginous seed materials.

The present invention is best accomplished by forming an aqueous slurry of the full fat, low fat or defatted oleaginous seed meals, flakes, or flours, said slurry having a pH in the range of about 5.1 to about 5.9. Preferably, the pH is adjusted to about pH 5.5. A pH much below 5.1 results in the extraction of little or no protein. A pH much above 5.9 results in the extraction of proteins which do not exhibit viscous functional properties. The acid range is maintained by the addition of any suitable acid, such as citric, hydrochloric, phosphoric, sulfuric and the like.

The aqueous slurry is then agitated for a time sufficient to extract the desired acid soluble proteins from the oleaginous seed material. The particular time will depend upon the temperature and concentration of the slurry. In general, the temperature of extraction should be less than about 60° C. Preferably, the temperature is between about 30° C. and 50° C. Optimum extraction is achieved at about 40° C. At temperatures much above about 60° C., the yield of the desired protein fraction is severely diminished.

The concentration of oleaginous seed material in the slurry is usually less than about 15 percent (weight/volume basis) based upon the total volume. Preferably, the concentration ranges between about 8 to about 12 percent (weight/volume basis). Very low concentrations, are undesirable for economic reasons and concentrations higher than about 15 percent result in an excessively thick medium.

While the selection of a particular combination of temperature and concentration conditions may vary widely within the described ranges, it is most important that the conditions selected do not denature the protein to cause loss of protein functionality and production of undesirable flavors. Under the preferred conditions, the desired protein fraction will be extracted from the oleaginous material in less than 30 minutes.

To protect the oleaginous seed material from undue oxidation, it is desirable to add an antioxidant to the aqueous extraction media prior to suspending the oleaginous material therein. Preferably, an antioxidant such as sodium sulfite is added at a concentration of about 0.1 to 1.0 weight percent based upon the weight of oleaginous material. It should be noted that the addition of the antioxidant is not necessary to prepare the desired protein fraction of this invention.

Following the extraction of the desired acid soluble proteins from the oleaginous material, the liquid portion of the slurry is separated from the insoluble portion thereof by any convenient means such as filtration or centrifugation. The insoluble portion, which consists of proteins, carbohydrates and cellular matter, insoluble in the acid pH range, is set aside for concentrate and isolate processing.

The separated liquid portion of the slurry consists essentially of acid soluble proteins and acid soluble carbohydrates. The desired protein product is recovered from this separated liquid by such convenient means as isoelectric precipitation, ultrafiltration, reverse osmosis and the like. Those skilled in the art will recognize that isolectric precipitation of a protein from an aqueous dispersion thereof can be accomplished by adjusting the pH of the dispersion to about the isoelectric pH of the particular protein, i.e. pH of minimum protein water solubility. Equally well-known are the techniques of ultrafiltration, reverse osmosis, etc., where the selection of semi-permeable membranes or collodial filters allows a separation of proteins from aqueous dispersions based upon their molecular weight, size or configuration. For economic reasons, the most preferred means for separating the desired protein product is by isoelectric precipitation.

In the preferred manner of practicing the invention, isoelectric precipitation is best accomplished by adjusting the pH of the separated liquid portion of the slurry to about the isoelectric point of the particular proteins therein and separating the desired protein product from the aqueous solution by any conventional means such as by centrifugation or decantation. The supernatant portion resulting from isoelectric precipitation contains isoelectric soluble proteins and carbohydrates and is discarded. The remaining isoelectric insoluble precipitate is a unique protein product which emerges as a viscous liquid having a protein solids content of about 40 to 50 percent by weight. The properties of this protein product are indeed surprising, since commercially prepared protein isolate curd, precipitated at the isoelectric pH, emerges as a solid cake containing no more than 30 to 35 percent by weight solids.

The optimum isoelectric pH will depend upon the particular oleaginous seed starting material, but generally, the pH will be in the range from about pH 3.0 to about 5.0. Within this pH range, the viscosity of the recovered protein product will vary widely. For example, when soybean flour is the starting material the optimum pH for precipitation of the desired protein product is in the pH range of from about 3.5 to about 4.8. At a pH of 3.5, such protein product is extremely viscous and exhibits little fluidity. As the pH is increased from about 3.5 to about 4.8, the viscosity rapidly decreases until a minimum viscosity is reached at about pH 6.0. The pH for obtaining such protein product having optimum fluidity is about 4.4 to about 4.8.

While the protein product produced by the process of the present invention may be used in the viscous fluid state if desired, it can be dried under suitable conditions which will not denature the protein. Such drying methods which may be used include freeze drying, low temperature spray drying, vacuum drying and the like.

The protein product produced by this process is an exceptionally bland material which is free of added salts and the undesirable flavors and odors usually found in the prior art oleaginous protein products. The fluidity of the product is a distinct advantage in handling and pumping thereof. The unusual viscosity characteristics of the product may vary widely, but are mainly dependent on temperature, pH and solids concentration. With the proper selection of conditions, almost any viscosity can be obtained for a particular purpose.

At room temperature, the protein product produced from soybean by the process of the present invention contains 40 to 50 percent by weight protein solids at a pH of about 4.4 to 4.8 and closely resembles the consistency and viscosity of prior art protein solutions which have been previously treated with strong base, but it does not have the same thixotropic characteristics as such prior art solutions. As the temperature of this protein product is increased, the viscosity rapidly decreases and the product becomes even more fluid. The viscosity continues to decrease with increasing temperature up to a temperature of about 90° C., at which point the protein product coagulates into a firm textured irreversible gel.

The solids content of the protein product is one of its more unusual characteristics. For example, the protein product produced from soybean at room temperature and at pH 4.6 contains about 40 percent by weight protein solids when first isolated, but thereafter exudes water until the solids content is about 50 percent by weight. As the solids content increases so does the viscosity of the protein product. If water washing is desired to remove residual amounts of carbohydrates, the unique ability of the protein product to exude water is a distinct advantage. Washing can be accomplished by any convenient means without reducing the protein solids content of the protein product. Those skilled in the art will recognize that prior art isolate curds and mesophases cannot be water washed without dilution of the solids content and further costly and time consuming procedures are required to separate and purify them. To reduce the solids content of the protein product of this invention it is necessary to adjust the pH thereof to above about 5.0.

It has been discovered that the protein product produced by the process of the present invention can be formed as desired by any of the conventional methods such as wet and dry spinning, extrusion or creping methods. For example, due to its viscous nature and high protein solids content, it is possible to spin or extrude the viscous protein product directly, without the alkaline treatment required of prior art protein isolates. Proteinaceous fibers can be formed by forcing the viscous protein product through a spinneret into a coagulating medium. Due to its heat coagulability, fibers can be formed by spinning the protein product into any hot gaseous or liquid media at a temperature above about 90° C. The fibers so produced exhibit excellent tensile strength and elasticity and are stronger than conventionally produced proteinaceous fibers. Since high alkaline and salt conditions are avoided, the functional qualities of the protein are unaltered, and very low salt, in particular sodium salt, content is achieved.

Also due to its desirable heat coagulable properties, the protein product of the present invention can be used as a heat setting binder for other edible materials. For instance, it is possible to combine vegetable protein products such as shaped or spun fibers, and/or natural meat products such as dried or raw meat pieces, with the protein product and heat set the mixture at a temperature above about 90° C. to produce an excellent meat analog. Above about 90° C., the protein product coagulates and forms an excellent chewy textured protein matrix. In this type of application the protein product can be used as a partial or complete replacement for prior art binders such as egg albumen, casein, whey protein and the like.

The following examples are illustrative of the invention and are not intended to limit the scope thereof.

EXAMPLE 1

Fifty pounds of defatted soy flour and 0.5 pounds of sodium sulfite were suspended in 500 pounds of 40° C. tap water adjusted to pH 5.5 by the addition of phosphoric acid. This was a solids concentration of 10 percent soy flour on weight/volume basis. The aqueous suspension was maintained at pH 5.5 and agitated for 30 minutes to extract soluble proteins and carbohydrates. The liquid portion of the suspension was then separated from the insoluble solid material by centrifugation. The separated supernatant, containing extracted proteins and carbohydrates, was adjusted to pH 4.5 by the addition of phosphoric acid to precipitate the protein. The precipitated protein was then separated from the supernatant liquid by centrifugation. The precipitated protein product was a viscous liquid. It was analyzed and found to have the chemical and physical properties shown in the following Table 1. In the following examples, yield is expressed as a weight percentage of the total weight of the starting material.

TABLE I

| | |
|---|---|
| Moisture | 50% |
| Solids | 50% |
| Yield on solids basis | 10.9% |
| Kjeldahl Protein (N × 6.25) | 80.6% |
| Ash | 4.18% |
| Carbohydrates | 14.84% |
| Viscosity (22° C., pH 4.39) | 200,000 centipoise |
| Viscosity (37° C., pH 4.39) | 41,600 centipoise |
| Viscosity (53° C., pH 4.39) | 17,600 centipoise |
| Heat coagulation temperature | 90° C. |

The analyses found in the above table illustrate some of the unique properties of the protein product of this invention. It will be appreciated by those skilled in the art that the combination of high protein solids and viscosity exhibited by this protein product has not been attainable with prior art protein isolates. As illustrated, viscosities were measured over a range of different temperatures and were found to decrease as the temperature was increased. The viscosity characteristic is clearly different from the alkaline, heat or salt produced properties of prior art protein products.

An ultracentrifuge analysis of the protein product of Example 1 was performed. The protein product was dissolved in a pH 7.6, 0.5 ionic strength phosphate buffer solution made 0.01 molar with mercaptoethanol. The buffer solution containing the dissolved protein product was then stirred for 2 hours, dialyzed against the 0.5 ionic strength buffer for 1 day, and centrifuged to remove suspended material. This prepared sample was then analyzed in the ultracentrifuge at a top speed of 60,000 rpm. Based upon the relative sedimentation rates in the ultracentrifuge, the protein product was composed of three protein components. The three components were identified by their Svedberg (S) constants as 2S, 7S and 9.9S. The protein product was found to contain, based on relative peak size, greater than 70 percent of the 7S component. It is known from the literature that these identified protein components have the following molecular weight ranges, 2S having a molecular weight of about 20,000 to 30,000, 7S having a molecular weight of about 180,000 to 300,000, and 9.9S having a molecular weight in excess of 300,000. By contrast, the prior art protein isolates, which have been similarly analyzed, have been found to contain only about 25 to 30% of the 7S protein component. These studies illustrate the unique nature of the protein product of this invention.

EXAMPLE 2

This example illustrates the effect of pH on the extraction of the desired protein product. Separate slurries were prepared, each containing 1500 grams of defatted soy flour and 15 grams sodium sulfite suspended in 15 liters of 22° C. tap water (10 percent soy flour on weight/volume basis). To each slurry, sufficient 10 percent by weight phosphoric acid was added to adjust the pH of the slurry to a selected pH value between 5.0 and 6.0. Each slurry was then agitated for 30 minutes to extract soluble proteins and carbohydrates. The soluble portion of each slurry was then separated from the solids portion by centrifugation. To each of the separated supernatant liquids, containing the extracted proteins and carbohydrates, was added sufficient 10 percent by weight phosphoric acid to adjust the pH of the solution to about 4.6 and to precipitate the protein. The precipitated protein was separated from the supernatant liquid by centrifugation.

The yield and physical characteristics of the protein product thus produced were compared, and the results obtained are found in the following Table II.

TABLE II

| Extraction pH | Yield, % by weight | Physical Appearance |
|---|---|---|
| 5.0 | 1.3 | soft white curd |
| 5.2 | 1.2 | viscous fluid |
| 5.4 | 4.6 | viscous fluid |
| 5.6 | 8.5 | viscous fluid |
| 5.8 | 11.2 | very viscous fluid |
| 6.0 | 19.5 | sticky dough like curd |

From the results shown in the above table, it will be observed that the yield and physical appearance of the protein product are dependent upon the extraction pH. As can be seen, the yield of the protein product increases with increasing pH, and the physical appearance thereof dramatically changes between pH 5.0 and 5.2 and between pH 5.8 and 6.0. This example shows that the desired protein fraction is obtained by extraction at a pH from about 5.1 to about 5.9.

EXAMPLE 3

This example illustrates the effect of extraction temperature on the yield of the desired protein product. Separate slurries of defatted soy flour were prepared in the manner described in Example 2 where the pH of extraction was adjusted to 5.5. The temperature of the tap water used to prepare each slurry was previously adjusted to a selected temperature between 20° and 75° C. Each slurry was treated in the same manner described in Example 2 and the precipitated protein product was collected.

The yields of protein product produced by the above procedure were compared and the results may be found in the following Table III.

TABLE III

| Extraction Temp. | Precipitate weight (grams) | Solids % by weight | Solids (gram) | Yield % by weight |
|---|---|---|---|---|
| 20° C. | 276 | 46 | 127 | 8.5 |
| 40° C. | 328 | 50 | 164 | 10.9 |
| 55° C. | 146 | 50 | 73 | 4.9 |
| 75° C. | 62 | 28 | 17.4 | 1.2 |

The results shown in the above table clearly indicate that yield of the protein product is dependent upon extraction temperature. Optimum yields are obtained at 40° C. and minimum yields are obtained at temperatures of about 75° C. or above. Within the preferred temperature range, the protein product contains about 40 to 50 percent by weight solids. Above about 75° C., yield and solids content of the desired protein product are drastically reduced.

EXAMPLE 4

This example illustrates the effect of precipitation pH on the yield and physical characteristics of the desired protein product. Fifty pounds of defatted soy flour were suspended in 500 pounds of room temperature tap water adjusted to pH 5.5 and agitated for 30 minutes. (10 percent soy flour on weight/volume basis). The liquid portion of the suspension was separated from the solids portion by centrifugation. The separated liquid was divided into four equal portions. To each portion sufficient phosphoric acid was added to adjust the pH of the liquid to a selected pH value between 3.0 and 4.8 to precipitate the protein. The protein precipitated from each liquid was then collected by centrifugation.

The yield and physical characteristics of the protein product thus produced were compared, and the results are found in the following Table IV.

TABLE IV

| Precipitation pH | Yield (%) by weight | Physical Appearance |
|---|---|---|
| 3.0 | 9.3 | curd like cake |
| 4.0 | 8.9 | very viscous fluid |
| 4.6 | 8.6 | viscous fluid |
| 4.8 | 7.7 | less viscous fluid |

From the results shown in the above table, it is seen that precipitation pH has a moderate effect on the yield of the desired protein product and a greater effect on its physical appearance. Maximum yields were obtained by precipitation at about pH 3.0; however, at a pH much below about 4.0, the protein precipitates as a curd like cake, whereas the protein precipitated at pH 4.0 and above exhibits greater fluidity. It is interesting to note that, while the protein precipitated at below about 4.0 has a curd like appearance, a subsequent pH adjustment of the separated curd to the pH range of 4.0 to 4.5 produces a fluid protein product. Prior art isolate curd does not exhibit this viscosity characteristic.

EXAMPLE 5

This example illustrates the preparation of spun protein fibers using the protein product of this invention. A portion of the viscous liquid protein product produced by the procedure of Example 1, having about 50% protein solids at a pH of 4.5, was forced through a 0.5 inch diameter spinneret and into water heated to above 90° C. to produce fibers. The spinneret contained about 60 holes having a uniform orifice diameter of 0.008 inch. The resulting fibers were extremely resilient and elastic. When placed in the mouth and masticated, the fibers exhibited chewy characteristics similar to real meat.

EXAMPLE 6

This example illustrates the use of the protein product of this invention as a binder in the preparation of a meat analog. A portion of the viscous liquid protein product produced by the procedure of Example 1, adjusted to about pH 5.5, was incorporated into a meat analog formulation containing the ingredients listed below.

| Ingredient | Amount |
|---|---|
| Texturized Vegetable Protein | 42 gm. |
| Water | 99 gm. |
| Fat and Emulsifiers | 22 gm. |
| Starch | 10 gm. |
| Protein fraction of Example I | 22 gm. |

The mixture was stuffed into a mold and retorted for 30 minutes at 104° C. The material was then uniformly sliced and fried.

Two control mixtures were similarly prepared. The first mixture was prepared as a negative control containing no binder. The second mixture was prepared as a positive control containing the conventional binder, egg albumen, instead of the desired protein product. Each mixture was then molded, heated, sliced and fried in the same manner described above.

The fried products were compared on the basis of mouthfeel and texture. The fried analog prepared with the protein product of this invention and the positive control analog containing egg albumen were similar in mouthfeel and had excellent texture. The negative control analog containing no binder had poor mouthfeel and a mushy texture. The ease and low cost of obtaining the protein product of this invention as compared to the prior art binders represents a considerable advantage in preparing meat analogs.

What is claimed is:

1. A process for producing a heat coagulable viscous protein product substantially free of added salts which comprises:
   a. forming an aqueous slurry of an oleaginous seed material present at a solids concentration of less than about 15 percent (weight/volume basis) based upon the total volume, said slurry having a pH of about 5.1 to about 5.9;

b. separating the liquid from the solids portion of said slurry; and c. recovering said protein product from said separated liquid.

2. A process according to claim 1, wherein the oleaginous seed material is leguminous.

3. A process according to claim 1, wherein the oleaginous seed material is a defatted leguminous material.

4. A process according to claim 3, wherein the defatted leguminous material is soybean and the temperature of the aqueous slurry is less than 60° C.

5. A process according to claim 1, wherein the aqueous slurry has a pH of about 5.5 and the aqueous slurry is maintained at a temperature between about 30° C. and 50° C.

6. A process according to claim 1, wherein an antioxidant is added to the aqueous slurry at a concentration less than about 1 weight percent based upon the weight of the oleaginous seed material.

7. A process according to claim 1, wherein the aqueous slurry of an oleaginous seed material is agitated.

8. A process according to claim 1, wherein the oleaginous seed material is defatted soybean material present at a solids concentration of between about 8 and about 12 percent (weight/volume basis) based upon the total volume, and the aqueous slurry has a pH of about 5.5, and is maintained at a temperature of about 40° C.

9. A process according to claim 1, wherein the heat coagulable viscous protein product is recovered from said separated liquid by isoelectric precipitation.

10. A process according to claim 9, wherein isoelectric precipitation is accomplished by adjusting the pH of said separated liquid to a pH between about 3.0 and 5.0.

11. A process according to claim 10, wherein the pH is between about 4.4 and 4.8.

12. A process according to claim 1, wherein the heat coagulable viscous protein product is recovered from said separated liquid by ultrafiltration.

13. A heat coagulable viscous protein product prepared in accordance with the process of claim 1.

14. A process for preparing proteinaceous fibers, which comprises: forcing the protein product of claim 13 through a spinneret and into a coagulating medium to form proteinaceous fibers.

15. A process according to claim 14 wherein the coagulating medium is a hot gaseous or liquid medium having a temperature above about 90° C.

16. A meat analog, which comprises: a heat set mixture of a heat coagulable, viscous protein product of claim 13, and a member selected from the class consisting of vegetable protein products and natural meat products.

* * * * *

UNITED STATES PATENT AND TRADEMARK OFFICE
CERTIFICATE OF CORRECTION

PATENT NO. : 4,188,399
DATED : February 12, 1980
INVENTOR(S) : Michael Shemer

It is certified that error appears in the above–identified patent and that said Letters Patent are hereby corrected as shown below:

Column 9, Line 2, change "about 5.9" to --5.8--.

Signed and Sealed this

Twenty-second Day of July 1980

[SEAL]

Attest:

SIDNEY A. DIAMOND

Attesting Officer

Commissioner of Patents and Trademarks